(12) United States Patent
Sajonia

(10) Patent No.: US 8,899,676 B2
(45) Date of Patent: Dec. 2, 2014

(54) BICYCLE SEAT

(76) Inventor: Charles Blake Sajonia, Germantown, MD (US)

(*) Notice: Subject to any disclaimer, the term of this patent is extended or adjusted under 35 U.S.C. 154(b) by 0 days.

(21) Appl. No.: 13/574,792

(22) PCT Filed: Jan. 25, 2011

(86) PCT No.: PCT/US2011/000131
§ 371 (c)(1),
(2), (4) Date: Jul. 24, 2012

(87) PCT Pub. No.: WO2011/093993
PCT Pub. Date: Aug. 4, 2011

(65) Prior Publication Data
US 2012/0292959 A1 Nov. 22, 2012

Related U.S. Application Data

(60) Provisional application No. 61/336,810, filed on Jan. 27, 2010.

(51) Int. Cl.
*B62J 1/00* (2006.01)
*B62J 1/08* (2006.01)

(52) U.S. Cl.
CPC ..... *B62J 1/00* (2013.01); *B62J 1/08* (2013.01)
USPC .................................................. 297/215.14

(58) Field of Classification Search
CPC ................. B62J 1/08; B62J 1/00; B62J 1/10; A63B 22/08

USPC .............................. 297/215.14, 215.13, 195.1
See application file for complete search history.

(56) References Cited

U.S. PATENT DOCUMENTS

| | | | | |
|---|---|---|---|---|
| 4,772,069 A | * | 9/1988 | Szymski | 297/215.14 |
| 5,007,675 A | * | 4/1991 | Musto et al. | 297/215.14 |
| 5,513,895 A | * | 5/1996 | Olson et al. | 297/215.14 |
| 6,752,453 B1 | * | 6/2004 | Yapp | 297/215.14 |
| 7,494,181 B2 | * | 2/2009 | Tucker | 297/201 |
| 7,762,931 B2 | * | 7/2010 | Fisher et al. | 482/57 |
| 2003/0227198 A1 | * | 12/2003 | Menayan | 297/215.14 |

* cited by examiner

*Primary Examiner* — Milton Nelson, Jr.
(74) *Attorney, Agent, or Firm* — Charles Blake Sajonia

(57) ABSTRACT

A bicycle seat is provided that allows for dynamic adjustment of longitudinal seat position when a locking mechanism is unlocked. In one embodiment, the unlocking is accomplished by lifting the nose of the seat body away from the base, thus providing the capability of dynamic adjustment of longitudinal or fore-aft seat position while riding without the component complexity and aerodynamic drag limitations of prior art devices. In an alternative embodiment, a bolt protruding from the seat body is retracted to disengage the locking mechanism and allow dynamic adjustment of longitudinal seat position without lifting the nose of the seat body. A vertical adjustment corresponding to the longitudinal position of the seat is taught to maintain, if desired, the same distance between bike seat and pedals for any longitudinal position of, the seat.

7 Claims, 6 Drawing Sheets

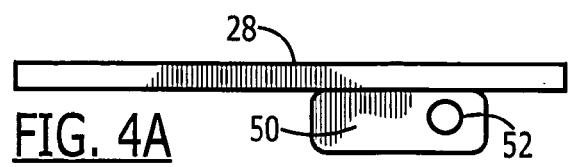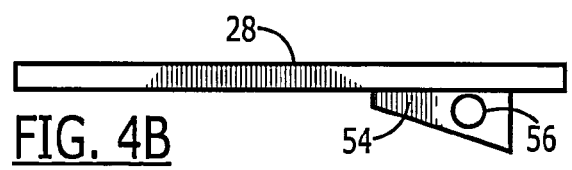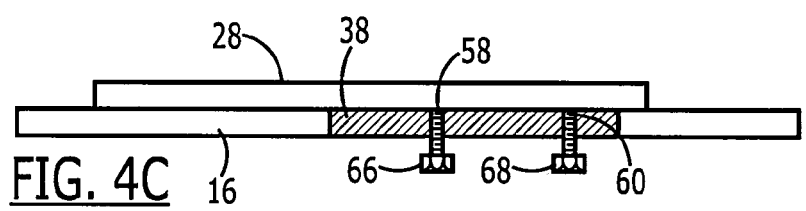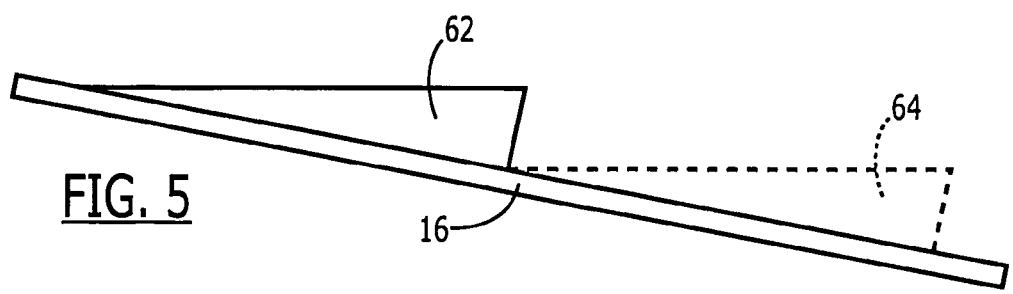

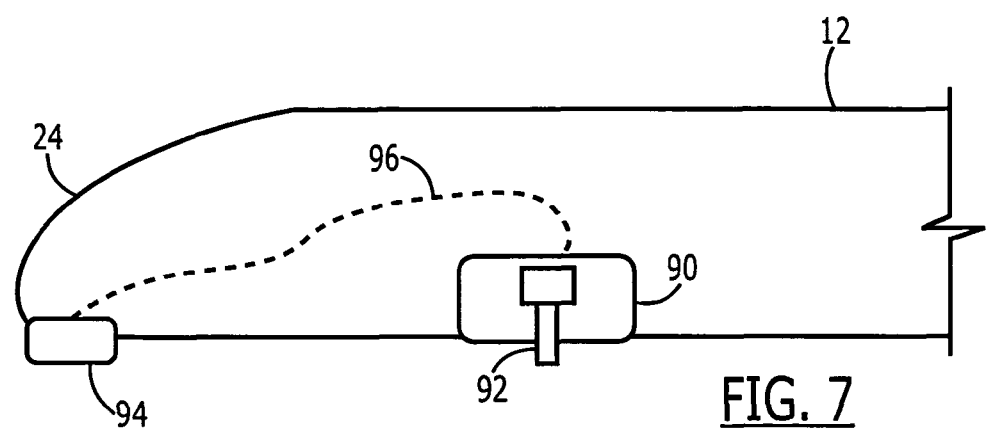

BICYCLE SEAT

CROSS-REFERENCE TO RELATED APPLICATION

This application claims priority to U.S. Provisional Patent Application No. 61/336,810 filed on 27 Jan. 2010, which is incorporated herein by reference in its entirety.

TECHNICAL FIELD

The present invention relates to the field of bicycles.

BACKGROUND OF THE INVENTION

For both recreational and competitive bicycle riders, the fit of a bicycle and the adjustment of the rider's position on the bicycle are key considerations that directly impact overall performance. Such parameters as comfort, safety, aerodynamic efficiency, power delivery, and endurance are influenced by fit and rider position.

Given the importance of rider fit and position, considerable information and various techniques are available to obtain the proper bike fit when purchasing a bike, and then to adjust the rider's position on the bicycle so selected, taking into account comfort, safety, aerodynamics, and power delivery. By way of example, the book entitled "Zinn & the Art of Triathlon Bikes" (hereinafter referred to as "Zinn"), published in 2007 by VELOPRESS, a trade name for a division of Inside Communications, Inc., provides detailed instructions and illustrations of bike and bike equipment selection and rider positioning on the bike. This is particularly important for triathlon bikes equipped with aerobars as illustrated and described in Zinn, but also applies to road bikes, mountain bikes, hybrids, and other types of bicycles, including stationary exercise bikes. The material most relevant to the present invention appears in Zinn chapters 2, 3, and 13, which is incorporated herein by reference in its entirety.

As taught in Zinn, the process of rider position adjustment includes various position modifications and fine-tuning that are performed to put the rider in the best possible position on the bike. Key adjustments include seeking the best seat position in height and longitudinal location for the bike owner. The longitudinal position is also referred to as fore-aft position of the bike seat or saddle and is illustrated in Zinn at FIG. 2.3 along with the relationship between fore-aft position and seat-tube angle. The term "effective seat-tube angle" refers to the result achieved by positioning the seat in different fore-aft locations as opposed to the neutral position over the seat post, thereby changing what is referred to in the art as the effective seat-tube angle. The actual angle formed between the seat tube and the horizontal plane or level ground, however, remains constant on a given bicycle frame, but the rider experiences the effective angle as though it were the actual seat-tube angle.

Using typical bicycle components, and as illustrated and described in Zinn, the rider's position is optimized, then fixed. That is, the bicycle components are secured in place with clamps, bolts, or the like. Subsequent adjustments may be done periodically by riders based on comfort and performance considerations from riding, or when new equipment is purchased, such as a new seat or new handlebars or aerobars. The problem with this current state of the art is that the optimal seat longitudinal position and corresponding effective seat-tube angle vary during a ride. This occurs, among other reasons, because of changing road conditions such as inclines, which cause the rider to sit upright as opposed to riding in the aerobars or drop bars, and during times in which the rider needs to take in fluids or food, and to stretch or otherwise relax back muscles. The adjustability of longitudinal seat position is also advantageous in allowing the rider to emphasize or recruit different muscle fibers at different times during a ride or race.

Attempts have been made by others to provide for dynamic seat adjustability in response to the desirability of seat adjustment during a ride. The term "dynamic seat adjustability" as used herein refers to the feature of seat adjustability while riding. The prior art devices that provide for dynamic seat adjustability are generally unsuitable for use with many bikes, particularly road racing, triathlon, and time-trial bikes because of the prior art component's weight, size, or aerodynamic drag burdens.

One example of a prior art attempt at solving this problem is U.S. Pat. No. 6,827,397. The device described in the '397 patent does provide dynamic adjustability in longitudinal seat position, but at the expense of creating an awkward and large seat, which is incompatible with existing seats and the desire for minimum weight, volume, and aerodynamic drag. In addition, the device of the '397 patent suffers from complexity in its components and operation. The device includes a large boom which extends well forward of the seat post, a locking system having multiple components, and a release lever located behind the seat, which must be manipulated to adjust the seat position. Not surprisingly, such prior art devices are seldom if ever used, especially in a triathlon, road bike race, or the like.

Other prior art attempts at solving this problem of rider positioning teach away from the present invention. Several leading manufacturers and designers of bicycle seats for use by riders with aerobars have adopted as a design feature a wider or heavily padded nose, or a combination of both, so that the rider can slide forward and sit on the nose of the seat when in a forward position using the aerobars or when such a position is desired to recruit different muscle fibers. The width of the seat in the nose area and the amount of padding in that area, however, are limited by the rider's need to pedal unimpeded when sitting in the normal position. The practice of sitting on the nose of the seat, or anywhere forward of the optimized shape and padded area is generally a painful compromise for the athlete, perhaps delivering faster riding speeds for some, but at the expense of a sore buttocks, tail bone, and/or genitals. In addition, there are medical concerns about possible injury to the rider from concentrated and prolonged pressure to the genitalia caused by sitting on a narrow bike seat for extended periods of time.

Accordingly, what is needed is a bicycle seat with a mounting system, which provides for easy longitudinal adjustability of the seat position during a ride while minimizing the component weight, volume, and aerodynamic drag. Ideally, the bicycle seat mounting system should allow for compatibility with existing bicycle seat shapes and sitting surface designs, and existing seat posts and seat-post clamps so as to take full advantage of the products currently available in the marketplace as well as the advancements that can be expected in those product areas. Additionally, a vertical adjustment corresponding to the longitudinal position of the seat is desirable to maintain approximately the same distance between bike seat and pedals for any longitudinal position of the seat.

SUMMARY

A bicycle seat is comprised of a seat body having a sitting surface and a nose, a base, means for attaching the base to a seat post, and means for attaching the seat body to the base such that the seat body is free to move along the longitudinal axis of the base when a locking mechanism is unlocked. In one embodiment, the unlocking is accomplished by lifting the nose of the seat body away from the base, thus providing the capability of dynamic adjustment of longitudinal or fore-aft seat position while riding. In an alternative embodiment, a bolt protruding from the seat body is retracted to disengage the locking mechanism and allow dynamic adjustment of longitudinal seat position without lifting the nose. A vertical adjustment corresponding to the longitudinal position of the seat is taught to maintain, if desired, the same distance between bike seat and pedals for any longitudinal position of the seat. Details of various embodiments of the invention are set forth in the accompanying drawings and the description below. Other features, objects, and advantages of the invention will be apparent from the description and drawings, and from the claims.

BRIEF DESCRIPTION OF DRAWINGS

FIG. 4 is a side elevation view of three alternative mounting means for providing a linear-motion degree of freedom for longitudinal positioning and a rotational degree of freedom for unlocking a locking mechanism.

FIG. 5 is a side elevation view illustrating the vertical adjustment capability provided by the present invention for maintaining approximately the same distance between bike seat and pedals for any longitudinal position of the seat.

FIG. 7 is an elevation view illustrating an alternative locking mechanism.

Like reference symbols in the drawings indicate like elements.

DETAILED DESCRIPTION

Figure 1A:
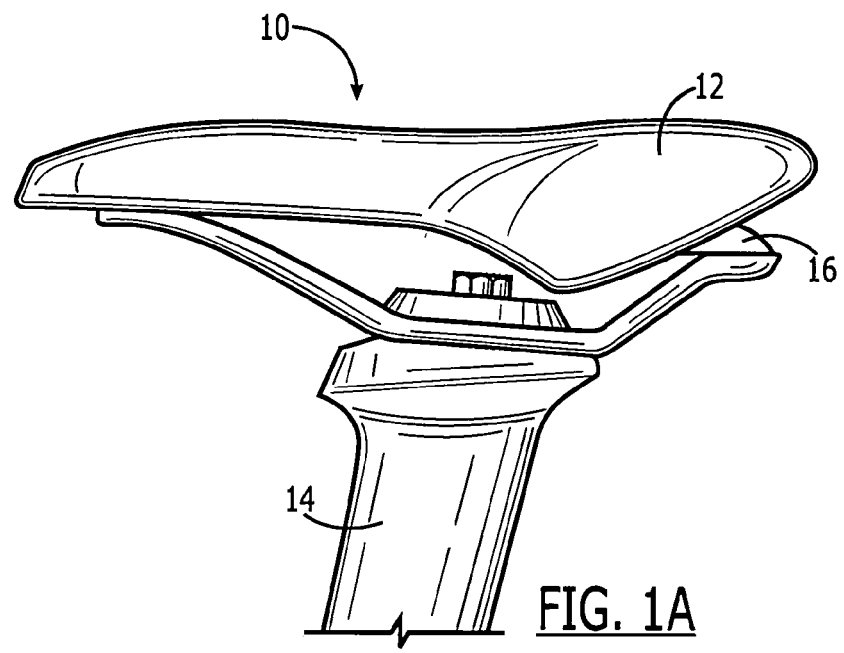
FIG. 1 is a perspective view of an exemplary embodiment of the present invention illustrating its range of motion for dynamic adjustability.
Figure 1B:
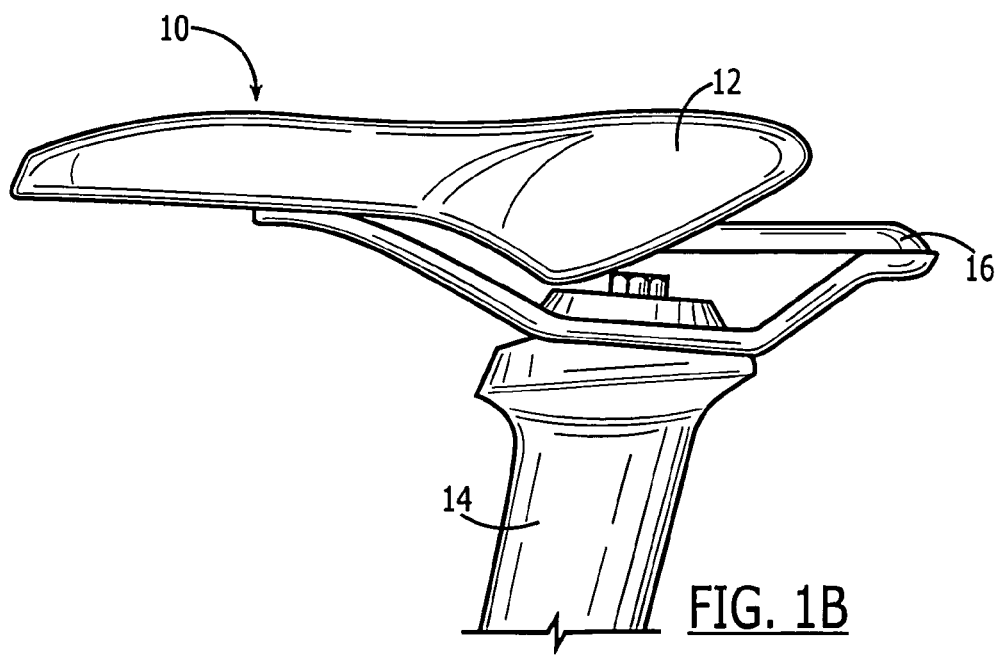

An exemplary embodiment of a bicycle seat in accordance with the present invention is illustrated in FIG. 1. The longitudinal adjustability of bicycle seat 10 is shown in the two perspective views included in FIG. 1 with the top depiction showing the seat-aft position of seat body 12 relative to the bike frame as referenced by seat post 14, and the bottom depiction showing the seat-forward position. As illustrated in these views, ample longitudinal adjustability of bicycle seat 10 is provided by the present invention while maintaining structural stability. That is, the center of mass of a rider sitting atop seat 10 remains within an acceptable longitudinal offset distance from the centerline of seat, post 14 so as to limit the moment or torque and corresponding stresses applied to seat post 14 and its clamp to acceptable levels. As will be apparent from the following description, the present invention is compatible with existing designs of seat posts 14, including their clamps, as well as the shape and sitting surfaces of bicycle seat bodies 12. In this way, the present invention takes full advantage of the products currently available in the marketplace and advancements that can be expected in those product areas. Accordingly, seat body 12 may be of any shape, size, and material appropriate or desirable for use as a bicycle seat. Similarly, seat post 14 can be of any design for use with standard bicycle seat rails, non-standard seat rails, or other seat post designs such as those utilizing a flange connection to affix seat 10 to seat post 14.

Key features of the present invention are its ease of adjustment and simplicity in construction and operation. In one embodiment, as will be fully described below, a rotational degree of freedom is provided such that seat body 12 is unlocked by lifting the nose of seat body 12 away from its base 16, thus allowing seat body 12 to be positioned at the desired location in the longitudinal plane relative to base 16 and seat post 14, which are fixed relative to the bike frame. The rider can perform this dynamic seat adjustment while momentarily supporting his or her weight on the bicycle pedals in order to remove the rider's weight on seat body 12 and to provide the minimal clearance needed to lift the nose of seat body 12 to disengage or unlock the locking mechanism. Once the seat is in the desired longitudinal position, the rider simply returns the nose of seat body 12 to its normal position where the locking mechanism is activated or locked. The entire dynamic adjustment process can be performed in as little as a few seconds and can be repeated as often as desired to adjust and readjust the seat position throughout a ride.

All of the components of the present invention are of sufficient strength to withstand normal design loads, including static and dynamic forces that could act against the components during bicycle operation. For example, the fastening means to secure seat body 12 to base 16 must withstand the shear forces that will result from a rider pressing against seat body 12 when pedaling forcefully. Similarly, these as well as other components of the present invention must withstand the vertical force of the rider's weight plus any dynamic force resulting from riding conditions such as riding over a pot hole in the road. Such design considerations, and corresponding solutions, are well known in the art of bicycle design, and bicycle part design, and are easily verified through routine product testing. Thus, suitable materials and sizes for components of the present invention can readily be selected by someone of ordinary skill in the art, and a wide range of options are available. By way of example, the structural components of the present invention may be made of a material such as aluminum, stainless steel, titanium, other metals, carbon fiber, hardened ceramic material, other composites, or a combination of two or more materials. Attachment means to bind one component to another component may include various mechanical fasteners, welding, high-strength adhesives, or through the use of forming and bonding materials such as fiberglass, carbon fiber, or epoxy. Alternatively, some of the elements that are shown as separate components herein can be manufactured as a single element. Furthermore, the seat body and sitting surface of the present invention may be made of any material suitable for such components, including those of future development in seat body and sitting surface design.

Figure 2:
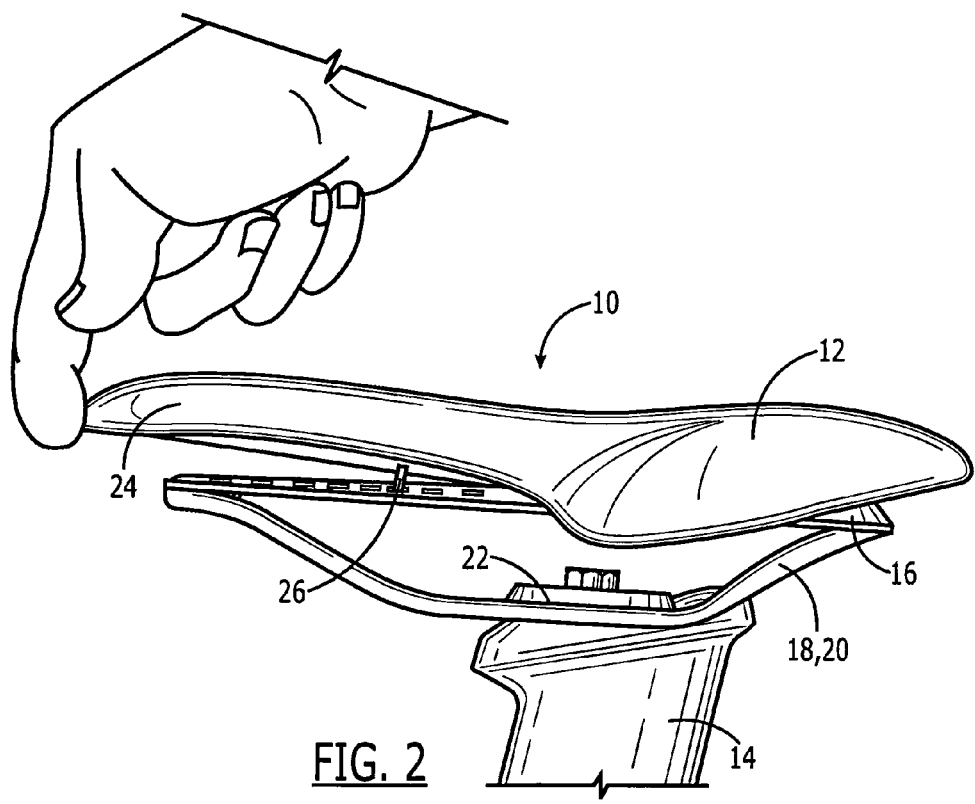
FIG. 2 is a perspective view of the present invention illustrating operation of one embodiment of a locking mechanism.

Turning to FIG. 2, a perspective view is provided to illustrate the ease of operation of one embodiment of a locking mechanism as taught herein. This embodiment of bicycle seat 10 includes seat body 12 and base 16. Base 16 includes rails 18, 20. Seat body 12 includes nose 24. In this particular embodiment, a peg 26 is used as part of a peg-and-aperture locking mechanism to prevent longitudinal movement when seat body 12 is in the normal position. Alternatively, a compression fitting, hook-and-loop type fastener also known under the trade name VELCRO, friction surface, suction cup, teeth engagement means, latch, solenoid bolt, or the like could be used in place of the peg-and-aperture locking mechanism illustrated here. The function of the locking mechanism is merely to prevent movement of seat body 12 relative to base 16 and post 14 when seat body 12 is in its normal position. The use of nose 24 of seat body 12 as the unlocking lever or mechanism as taught herein provides for ease of use and minimizes the number of components needed to achieve dynamic seat adjustability. This embodiment is also inherently safe and reliable in the sense that gravity acts to keep nose 24 in the normal position where longitudinal movement of bike seat 10, as well as other movement in the horizontal plane, is prevented. Moreover, the weight of the rider atop seat 10 further secures seat body 12 and nose 24 in the normal, locked position. The peg-and-aperture locking mechanism provides an attractive balance of simplicity and lock security. As fully taught below, some of the alternative embodiments for the locking mechanism, such as a friction surface, spring bolt, or solenoid bolt, minimize or completely eliminate the need for rotation of seat body 12. For some users, this might be the preferred embodiment. Factors to take into consideration are the possibility of wear and slippage of the friction surface over its service life and the need for a power source for the solenoid bolt.

Base 16 includes a substantially elongated plane on which seat body 12 rests and attachment means to conventional seat rails 18, 20 as depicted here. Non-standard rails, or another type of design such as a flange-type seat post mounting device, may also be used with the present invention. The standard or conventional seat rails 18, 20 are prevalent, which is why they are illustrated here. Rails 18, 20 are affixed to seat post 14 using a clamp 22. Various seat post and clamp designs are well known in the art and are readily available for use with the present invention.

Figure 3:
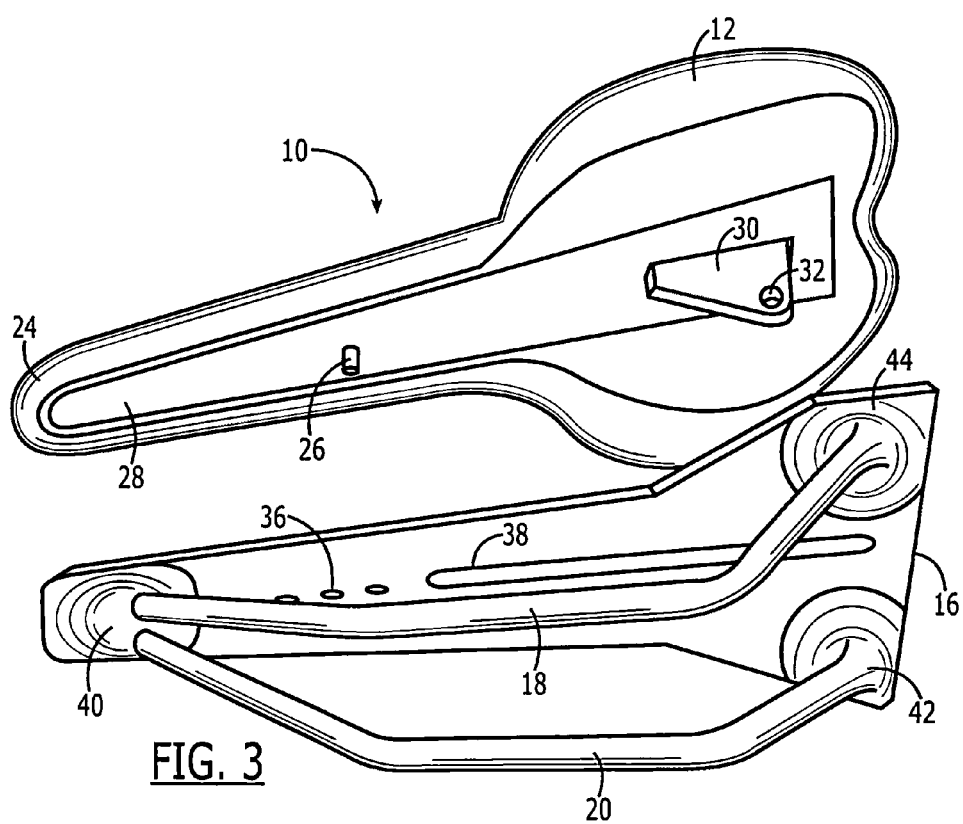
FIG. 3 is a perspective view of the bicycle seat of the present invention illustrating components of the base and seat body in one embodiment.

Turning to FIG. 3, a perspective view is provided to illustrate certain components of seat body 12 and base 16 in an exemplary embodiment. Seat body 12, in this embodiment, includes mounting surface 28, peg 26, and tab 30 having aperture 32. Unlike most prior art bicycle seats, the present invention separates seat body 12 from base 16. Traditionally, rails 18, 20 are affixed directly to the underside of seat body 12. While the present invention is substantially different in structure from most if not all prior art bicycle seats in order to provide the dynamic adjustability described herein, virtually any existing bicycle seat design can be adapted to add the elements shown in FIG. 3. In addition, a wide range of materials and methods of manufacturing are available and well known in the art.

By way of example, mounting surface 28, including tab 30 with aperture 32 may be made of the same plastic, composite, or other material as selected for use as the underside or weight bearing component of seat body 12. Mounting surface 28 should provide a substantially flat surface for even contact with the substantially flat base 16, and should be of sufficient strength for the dynamic and static loads that it will experience. Mounting surface 28 including tab 30 with aperture 32 may be manufactured separately from seat body 12 and attached thereto using high strength adhesive, thermal bonding of the two components, mounting screws, or other means. Alternatively, mounting surface 28 and tab 30 can be manufactured as an integral part of the same component that serves as the underside of seat body 12 though injection molding, thermal forming, or other well-known manufacturing means.

Peg 26 is preferably made of a high strength material such as stainless steel to resist bending, shearing, and other failure modes. Peg 26 can be fixed to mounting surface 28 using a threaded connection, high strength adhesive within an aperture, a tight compression fitting, or a combination of two or more of these techniques. Like tab 30, peg 26 can be fabricated as an integral part of mounting surface 28 in some cases depending on the material and manufacturing steps selected, or it can be attached subsequently. When seat body 12 is in the normal "down" position, peg 26 is contained within one of the corresponding apertures 36 provided in base 16. The peg-and-aperture arrangement shown here thereby serves as a locking mechanism to prevent longitudinal movement of seat body 12 relative to base 16 when the former is in its normal position. That is, with nose 24 in its normal "down" position, peg 26 is disposed within one of the corresponding apertures 36 provided in base 16 so that any horizontal movement of seat body 12 relative to base 16 is resisted by the contact between peg 26 and aperture 36. However, when nose 24 is lifted a short distance away from base 16, peg 26 clears apertures 36 such that longitudinal movement is possible.

Base 16 provides a substantially uniform, elongated flat surface on which mounting surface 28 rests with tab 30 disposed within slot 38 and peg 26 disposed within one of the corresponding apertures 36. Tab aperture 32 is used to secure tab 30 within slot 38. That is, tab 30 is placed in slot 38 and a bolt, cotter pin, or the like is placed through aperture 32 to keep tab 30 within slot 38 while allowing a linear motion degree of freedom as provided by the tab-and-slot arrangement shown here. This linear motion means is inexpensive to manufacture compared to commercially available pre-manufactured linear motion guides, however, the latter could be used in combination with a hinge mechanism if cost is less of an issue and higher precision movement is desired. That is, a "guide-with-hinge" component could be used. In general, both the "tab-and-slot" and "bolt-and-slot" means as taught herein are acceptable solutions for providing the degree of linear and rotational freedom and precision of movement needed for this application, and offer the advantages of lower cost, lower weight, and fewer parts, which results in greater reliability throughout the service life of the bicycle seat.

Rails 18, 20 as illustrated in FIG. 3 are attached to base 16 at connection points 40, 42, 44. Various means of connection are possible and well known in the art. The preferred choice of connection means will depend largely on the materials selected for base 16 and rails 18, 20. If base 16 and rails 18, 20 are made of the same high-strength composite, such as carbon fiber, then these components can be bonded together in the manufacturing process. If base 16 and rails 18, 20 are made of the same metal, such as carbon steel or stainless steel, then welding is a viable connection means. Welding should not be used, however, with metals in which strength, resistance to fatigue failure, or resistance to corrosion is sacrificed by welding. This problem occurs with certain types of metals and with incompatible combinations of metals, but again, this information is well known by one of ordinary skill in the art. When welding is to be avoided, for any reason including mere preference for another method, high-strength epoxy, mechanical fastening straps, other connection means, or a combination of these means can be used to secure rails 18, 20 to base 16. As illustrated here, a high-strength epoxy is used along with stainless steel wire (not visible) which is wrapped around rails 18, 20 at connection points 40, 42, 44, and embedded within the epoxy. The structural details of base 16 for accomplishing this function and other aspects of the invention are fully described below in reference to FIG. 6.

Turning to FIG. 4, side elevation views of three alternative mounting means are illustrated for providing the linear-motion degree of freedom for longitudinal positioning and a rotational degree of freedom for deactivating the locking mechanism described above. All three views show the same piece of mounting surface 28 from the same side elevation perspective. The bottom-most view shows base 16 and slot 38, which are omitted in the other two views for simplicity in illustration. In the top-most view, tab 50 is substantially rectangular in shape and includes aperture 52. Tab 50 is sufficient in length such that, when disposed in slot 38 it prevents undesirable movement of mounting surface 28 in directions other than the desired linear-motion line and range of movement. Tab 50, however, is not overly long to unduly limit the desired amount of travel of mounting surface 28 relative to base 16. As described above, tab 50 includes aperture 52 for securing it in slot 38.

The view in the middle of FIG. 4 includes a substantially triangular shaped tab 54 with aperture 56 to illustrate that various shapes and dimensions are possible to achieve the linear-motion degree of freedom for longitudinal positioning and a rotational degree of freedom for deactivating the locking mechanism. The key design considerations in addition to strength and reliability are adequate precision in guiding the desired movement and in effecting the desired stop points or limits of movement.

The bottom-most view of FIG. 4 illustrates an alternative means to accomplish the attachment of seat body 28 to base 16. Here, two bolts 58, 60, which are spaced apart by the desired separation distance, are utilized. Nuts 66, 68 can be used in this embodiment to secure bolts 58, 60 within slot 38. Commercially available nylon insert jam-lock nuts or cap nuts can be used for nuts 66, 68 to prevent movement of bolts 58, 60 out of slot 38 while still providing the desired linear and rotational degree of freedom. That is, nuts 66, 68 are not tightened in a way that completely binds mounting surface 28 to base 16, but provide for some movement along the longitudinal axis of the bolt, which results in a degree of rotational freedom. This is illustrated here by the length of bolts 58, 60 and the position of nuts 66, 68 relative to base 16. As was illustrated in FIG. 2, the rotational angle needed is between zero and roughly thirty degrees depending on the components selected for the locking mechanism and the preference of the manufacturer taking into account functional as well as human factors such as the preferred feel of operation. This is readily accomplished with available bolts and nuts, or their structural equivalent. The advantage of using nuts as opposed to a permanent rivet-type fastener is that the seat body may be removed from its base for cleaning or other reasons, including replacement of seat bodies. The use of bolts 58, 60 and nuts 66, 68 also provides the capability to adjust the linear and rotational ranges of motion by simply adding or removing washers.

Turning to FIG. 5, a side elevation view illustrates the vertical adjustment capability provided by the present invention for maintaining approximately the same distance between bike seat and pedals for any longitudinal position of the seat. As described in Zinn, the distance between bike seat and pedals is an important bike fit and adjustment consideration, and this distance changes, albeit slightly, with a change in the effective seat-tube angle, even when other parameters remain the same. While the ratio of vertical-to-longitudinal distance change is small given the geometry inherent of a bicycle, some riders will still desire the adjustment feature to compensate for this change. As taught herein, this adjustment feature can be provided automatically with longitudinal positioning of the seat. By separating seat body 12 from base 16 (as illustrated in FIG. 3), the present invention makes this enhanced feature easy to incorporate in the design of the bicycle seat. In FIG. 5, items 62, 64 represent seat body 12 having a substantially horizontal top surface when its bottom face is resting on base 16. As clearly shown in FIG. 5, the orientation of base 16 rises in elevation from right to left. This corresponds to a bike orientation with the aerobars or handlebars on the left as viewed in FIG. 5. When the seat is moved towards the aerobars or handlebars on the left, this action would normally decrease the distance between bike seat and pedals if done without benefit of the present invention, but as taught here the length variance is automatically corrected for by the rise as provided by base 16.

It should be noted that the actual angle of base 16 relative to horizontal is exaggerated in FIG. 5 for illustrative purposes. In practice, this is a small compensation angle, which is readily calculated or estimated for various bicycle frame sizes and seat heights. A given manufacturer may offer one or more compensation angles based on average sizes (such as small, medium, and large), which could also be selected based on rider preference. In addition, the present invention may be practiced without this vertical adjustment. Another alternative embodiment is to provide a larger compensation angle such that the present invention is used more for dynamic vertical adjustment of the seat position. This embodiment, for example, might be attractive to riders who frequently stand up on the bike pedals when riding up steep grades.

Figure 6:
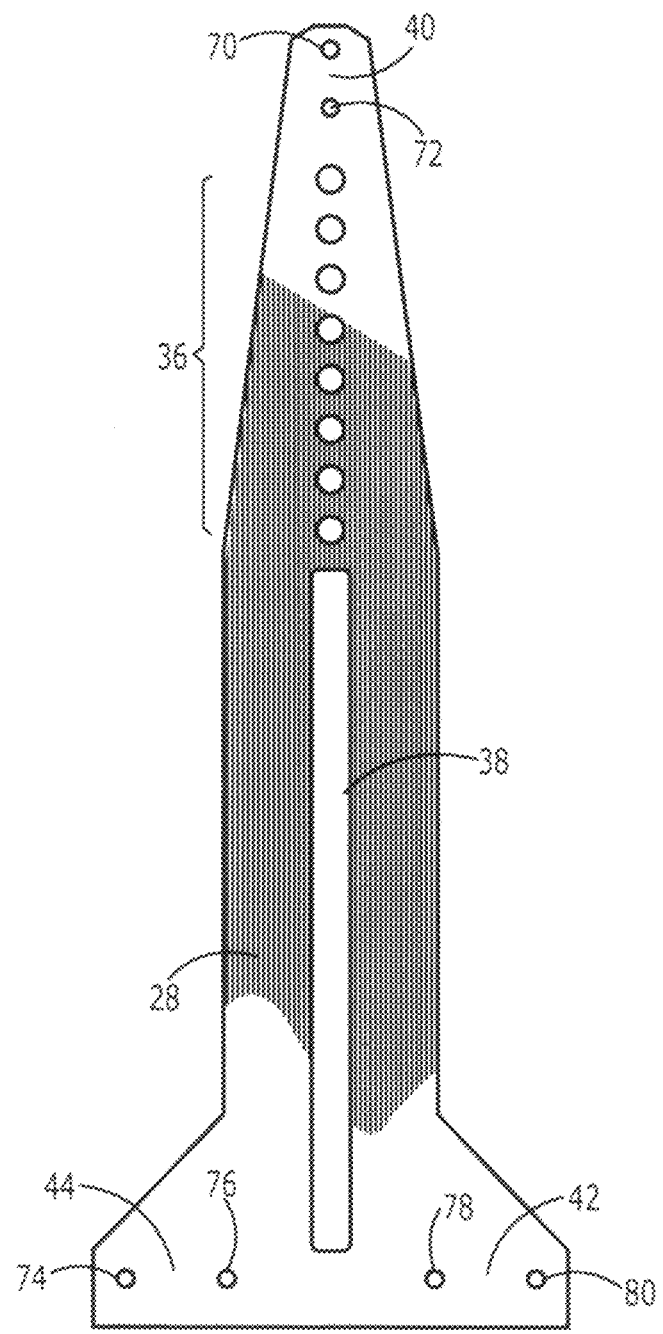
FIG. 6 is a top view of one embodiment of a base illustrating details for providing a linear motion degree of freedom and compatibility with seat rails.

Turning to FIG. 6, a top view of one embodiment of a base is illustrated to show details for providing a linear motion degree of freedom and compatibility with existing seat rails. Base 28 includes slot 38 as already fully described above. The full set of apertures 36 is visible in this view. As described above, apertures 36 are used with a peg for the peg-and-aperture locking mechanism as taught herein. Alternatively, apertures 36 could be used with a compression fit member that is sized appropriately to fit, with the proper compression, within apertures 36. Similarly, apertures 36 could be used with the solenoid bolt embodiment of the locking mechanism (illustrated in FIG. 7) with the solenoid and button disposed in the body of the bike seat and the bolt selectively disposed in one of the apertures 36. In some embodiments, apertures 36 are preferably omitted from base 36. By way of example, the suction cup, engagement teeth, hook-and-loop fastener, and friction surface embodiments work best without apertures 36.

Apertures 70, 72, 74, 76, 78, 80 as illustrated in this particular embodiment of base 28 are provided for use in fastening rails 18, 20 at connection points 40, 42, 44 as illustrated in FIG. 3. By way of example, stainless steel wire can be wrapped around rails 18, 20 at or near connection points 40, 42, 44 and passed through the corresponding aperture pairs 70, 72 and 74, 76 and 78, 80, respectively. Connection points 40, 42, 44 can then be bonded with epoxy that also covers the stainless steel wire wrapping and a portion of rails 18, 20. In this way, the strength of the connection and its resistance to both fatigue and high-impact failure modes is enhanced. Alternatively, mechanical fastening straps with nut-and-bolt fasteners that utilize apertures 70, 72, 74, 76, 78, 80 can also be used with the embodiment of base 28 illustrated here. Other fastening means will be apparent to those of ordinary skill in the art.

A wide range of suitable materials are available and well known in the art for use in fabricating base 28. By way of example, base 28 can be fabricated from 14 gauge 304 stainless steel sheet. Through testing of the present invention, this has proven to be of sufficient strength and ductility, while being corrosion resistant and acceptable in weight, especially when fabricated in the shape illustrated in FIG. 6. Alternatively, base 28 can be made of other types and sizes of metal sheets or plates, fiber carbon, metal reinforced or sufficiently thick fiberglass, another type of composite, a plastic of sufficient strength and stiffness, or a combination of materials. In addition, the shape and features of base 28 can be modified extensively from that illustrated here while still accomplishing the teachings of the present invention. For example, to utilize the present invention with a single flange-type seat post connector, two parallel slots can be used in place of the single slot 38 in order to offset the slots and locking mechanism of the present invention from the centerline where the single flange-type member of the seat post would otherwise create an obstruction.

Turning to FIG. 7, a solenoid bolt locking mechanism is illustrated. In this embodiment, seat body 12 includes a solenoid 90 and activation button 94. Lead 96 serves to communicate the electrical signal from button 94 to solenoid 90. Solenoid 90 is disposed within seat body 12 so as not to impeded movement of seat body 12 or its stability atop base 16 (not shown). When button 94 is pressed, solenoid bolt 92 is retracted into the body of solenoid 90 such that it no long protrudes out of seat body 12. Functionally, this is the equivalent of lifting seat nose 24 to raise peg 26 out of apertures 36 as illustrated in FIGS. 2-3. Accordingly, this embodiment does not require a rotational degree of freedom. Rather than lifting nose 24, button 94 is pressed. The power supply for solenoid 90 may consist of a small battery located in seat body 12. Preferably, the battery can be accessed and replaced through an opening on the underside of seat body 12. The preferred choice for the solenoid action is to be biased in the bolt-extended position so that in the event of loss of power or any type of fault condition, the bolt is extended and remains extended, thus preventing unintentional movement of seat body 12. A toggle switch of another type of actuator may be used in place of button 94.

An analogous mechanical embodiment to the solenoid locking mechanism will be readily apparent to those of ordinary skill in the art. Button 94 can be replaced with a mechanical lever for use in transferring a force to a spring-biased bolt. The mechanical spring substitutes for the solenoid in this embodiment of the locking mechanism. The configuration of the spring-biased bolt and mechanical lever would be similar to that illustrated in FIG. 7, in that the actuator lever would preferably be attached to nose 24 and the spring-biased bolt would be located in seat body 12 in the same approximate location as illustrated for solenoid bolt 92 in order to selectively engage one of the apertures 36. Additionally, both the solenoid bolt and spring bolt embodiments of the locking mechanism share the feature of eliminating the need for the rotational degree of freedom discussed above in reference to the peg-and-aperture embodiment.

While specific embodiments of the invention have been described, it will be understood that additional embodiments and various modifications may be made without departing from the spirit and scope of the invention. For example, the linear and rotational degree of freedom for the bicycle seat as taught herein can be provided by a single bolt and slot, or by two slots in a parallel arrangement with either one or two bolts per slot. Instead of bolts, equivalent structural members such as tabs, rods, plates, or flanges can be used. Also by way of example, a pre-manufactured linear motion guide used in combination with a hinge, referred to herein as a "guide-and-hinge" component may be used. Additionally, different locking mechanisms other than the ones illustrated herein can be used. For example, the two contact surfaces or the guide may utilize one or more friction surfaces to prevent unwanted movement as opposed to the peg-and-aperture component. This also may be accomplished through the use of a compression fitting, teeth-engagement means, a hook-and-loop type fastener, spring bolt, solenoid bolt, or other means to prevent unintentional longitudinal movement. In embodiments in which a friction member, spring bolt, or solenoid bolt is used as the locking mechanism, the rotational degree of freedom could optionally be omitted. Accordingly, these and other embodiments of the invention fall within the scope of the claims below.

What is claimed is:

1. A seat for use with a bicycle having a seat post, comprising:
   a base;
   means for attaching said base to the seat post;
   a seat body having a sitting surface and a nose;
   a locking mechanism for selectively securing said seat body to said base;
   means for attaching said seat body to said base such that said seat body is free to move along the longitudinal axis of said base when said locking mechanism is unlocked; and wherein said locking mechanism is unlocked when said nose is lifted away from said base.

2. The seat as recited in claim 1, wherein said locking mechanism is selected from the group consisting of a peg-and-aperture, compression fitting, suction cup, friction surface, hook-and-loop fastener, engagement teeth, spring bolt, and solenoid bolt.

3. The seat as recited in claim 1, wherein said means for attaching said seat body to said base is selected from the group consisting of a tab-and-slot, flange-and-slot, bolt-and-slot, and guide-with-hinge.

4. The seat as recited in claim 3, wherein said means for attaching said base to the seat post is selected from the group consisting of a seat post rail connector and seat post flange connector.

5. A seat for use with a bicycle having a seat post, comprising:
   a base;
   means for attaching said base to the seat post;
   a seat body having a sitting surface and a nose;
   a locking mechanism for selectively securing said seat body to said base;
   means for attaching said seat body to said base such that said seat body is free to move along the longitudinal axis of said base when said locking mechanism is unlocked; and wherein said locking mechanism is a solenoid bolt and said seat includes a button in communication with said solenoid bolt for deactivating the locking mechanism by retracting said solenoid bolt when said button is pressed.

6. The seat as recited in claim 5, wherein said means for attaching said seat body to said base is selected from the group consisting of a tab-and-slot, flange-and-slot, bolt-and-slot, and guide-with-hinge.

7. The seat as recited in claim 5, wherein said means for attaching said base to the seat post is selected from the group consisting of a seat post rail connector and seat post flange connector.

* * * * *